United States Patent [19]

Salensky et al.

[11] 4,135,014

[45] Jan. 16, 1979

[54] GLASS BOTTLE COATING COMPOSITIONS

[75] Inventors: George A. Salensky, Metuchen; Stanley H. Richardson, Millington, both of N.J.

[73] Assignee: Union Carbide Corporation, New York, N.Y.

[21] Appl. No.: 669,627

[22] Filed: Mar. 23, 1976

[51] Int. Cl.$^2$ ............................................. B65D 1/00
[52] U.S. Cl. .................................. 428/35; 215/DIG. 6; 427/29; 427/195; 427/314; 427/385 A; 428/441; 428/442; 428/429; 428/500
[58] Field of Search ................ 427/385, 314, 195, 29; 428/442, 441, 500, 35; 536/303; 260/29.6 PM; 526/304; 215/DIG. 6

[56] References Cited

U.S. PATENT DOCUMENTS

| | | | |
|---|---|---|---|
| 2,953,551 | 9/1960 | White | 526/229 |
| 3,136,651 | 6/1964 | Spessard | 427/195 |
| 3,344,014 | 9/1967 | Rees | 428/441 |
| 3,485,785 | 12/1969 | Anspon | 260/29.6 |
| 3,503,778 | 3/1970 | Corbett et al. | 427/195 |
| 3,674,761 | 7/1972 | Anspon | 260/87.3 |
| 3,706,592 | 12/1972 | Thomson | 427/387 |
| 3,711,456 | 1/1973 | Gilbert et al. | 428/441 |
| 3,784,396 | 1/1974 | Fourment et al. | 427/195 |
| 3,801,361 | 4/1974 | Kitaj | 428/441 |
| 3,850,681 | 11/1974 | Marzocchi | 427/387 |
| 3,873,352 | 3/1975 | Kitaj | 427/387 |
| 3,877,969 | 4/1975 | Tatsumi et al. | 428/442 |
| 3,895,126 | 7/1975 | Strauss et al. | 427/195 |
| 3,904,805 | 9/1975 | Johnson | 427/387 |
| 3,937,853 | 2/1976 | Shank | 427/195 |
| 3,970,626 | 7/1976 | Hurst | 260/29.6 WB |
| 3,971,690 | 7/1976 | Birnkraut et al. | 526/303 |

*Primary Examiner*—Ronald H. Smith
*Assistant Examiner*—Janyce A. Bell
*Attorney, Agent, or Firm*—Bernard Francis Crowe

[57] ABSTRACT

Glass bottle coating compositions have been formulated from ethylene copolymers containing ethylene, alkyl acrylate, acrylic acid and monoalkyl acrylamide moieties.

16 Claims, No Drawings

GLASS BOTTLE COATING COMPOSITIONS

BACKGROUND OF THE INVENTION

This invention pertains to glass bottle coating formulations and more particularly to those based on random ethylene copolymers, containing lower alkyl acrylate, acrylic acid and lower monoalkyl acrylate moieties in addition to ethylene moieties, together with minor amounts of adhesion promoters and heat stabilizers.

Carbonated beverages packaged in glass bottles are potentially hazardous because of the internal gas pressure. This internal gas pressure can explode defective bottles producing flying glass fragments which may injure occupants of the immediate vicinity. The larger carbonated beverage bottles, that is, those containing over 16 ounces are more prone to accidental explosion than smaller bottles.

Carbonated beverage bottles have been coated with various plastic materials in an attempt to ameliorate this dangerous condition. For example, a jacket of polystyrene foam has been used for protection of such bottles from impact thereby lessening breakage. However, the polystyrene jacket does not retain glass fragments upon breakage and therefore does not qualify as a shatter resistant bottle, the goal sought by the bottling industry.

An ethylene/vinyl acetate copolymer has been used on light-weight non-returnable carbonated beverage bottles to improve shatter resistance but such coatings are opaque and rough and require a thickness of at least 15 mils for glass containment.

Salts of ethylene/methacrylic acid polymers have been used for bottle coatings but are also limited to disposable or one trip bottles because the polymer coating does not stand the caustic treatment used in washing and sterilizing the returned bottles before reuse.

In general the following requirements exist for commercially acceptable polymer coatings for carbonated beverage bottles:

1. Fragment retention of beverage bottles containing 60 psig carbon dioxide internal pressure.
2. Appearance must be clear and have a smooth texture.
3. The polymer coated surface must provide good lubricity and label adhesion.
4. The polymer coating must be abrasion resistant and retain a good appearance under all use conditions.
5. The polymer coatings must be compatible with the environment.

Of the above requirements fragment retention is by far the most important and critical. One procedure used by bottle manufacturers comprises charging polymer coating bottles with 4 volumes of carbon dioxide, i.e., 60 psig and dropping them from a height of 4 feet in a horizontal position onto a steel plate embedded in concrete. The drop results in side wall failure generally in the impact area. A scatter index is calculated for 24 bottles by multiplying the percent glass found in concentric zones measured in feet from the point of impact. The percent retention is calculated as the percent glass retained within the distance of three feet from the point of impact. The desired FIGURE is greater than 80 percent.

Another test comprises dropping the pressurized bottles in a vertical position and measures the number of tears inflicted on a 4 mil polyethylene film surrounding the drop zone at a distance of 12 inches therefrom by flying glass particles.

Appearance is important to permit the consumer to inspect the contents of the coated bottle and to permit decorative printing directly on the bottle thus eliminating separate labeling operations at a bottling plant.

SUMMARY OF THE INVENTION

It has now been found that a composition meeting the above listed criteria for coating carbonated beverage bottles is provided by a composition consisting essentially of a random ethylene copolymer having a melt index of about 60 to about 120 decigrams per minute when measured at 44 psi and 190° C. in accordance with ASTM D-1238 Condition E, containing copolymerized therein:

(a) about 0.05 to about 4 mole percent of an acrylic ester moiety having the formula

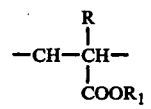

(b) about 0.01 to about 1 mole percent of an acrylic acid moiety having the formula:

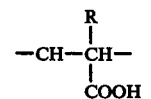

(c) about 2 to about 8 mole percent of an amide moiety having the formula:

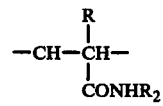

wherein R is hydrogen or methyl and each of $R_1$ and $R_2$ is an alkyl group having 1 to 4 carbon atoms and the remainder being ethylene moieties.

The ethylene copolymers used in the instant invention can be prepared by a melt ammonolysis reaction between an ethylene/alkyl acrylate random copolymer and a monoalkyl amine having 1 to 4 carbon atoms in the alkyl group at temperatures in the range of about 250 to 300° C. A detailed description of this reaction is contained in Japanese Pat. No. 42,370 issued on Dec. 15, 1971 to K. Maemoto et al.

The preferred ethylene/alkyl acrylate random copolymers used for the preparation of the random ethylene copolymers of this invention are ethylene/ethyl acrylate copolymers which are commercially available. Their preparation is described in U.S. Pat. No. 2,953,551 issued to W. G. White on Sept. 20, 1960. Preferred and commercially available ethylene/ethyl acrylate copolymers contain from about 5 to about 25 weight percent ethyl acrylate copolymerized therein. A particularly preferred ethylene/ethyl acrylate copolymer contains about 18 weight percent ethyl acrylate copolymerized therein.

While the ethylene copolymers of this invention can range in melt index from about 60 to about 120 decigrams per minute as measured according to ASTM D-1238 at 44 psi and 190° C., it is preferred to use copolymers having a melt index of about 80 to 100 decigrams per minute.

While the alkyl acrylate moiety content of the random ethylene copolymers of this invention can range from about 0.05 to about 4 mole percent, it is preferred to use copolymers containing about 0.1 to about 3 mole percent, particularly for returnable bottles which are subjected to aqueous caustic. This treatment causes copolymers which have an alkyl acrylate moiety content above about 3 mole percent to become very opaque and decreases adhesion between the copolymer coating and glass surface. This effect is apparently due to the formation of alkali metal acrylate moieties which modifies certain properties of the copolymer coating which are peculiarly critical for a polymeric bottle coating.

The preferred random ethylene copolymers of this invention contain about 0.5 to about 0.8 mole percent of acrylic or methacrylic acid moieties together with about 4 to about 7 mole percent of amide moieties.

The preferred range of ethylene moieties in the random ethylene copolymers lies in the range of about 90 to about 95 mole percent.

It was quite unexpectedly discovered that only monoalkyl substituted acrylamides containing copolymers can be used as bottle coatings. The presence of dialkyl substituted acrylamide moieties renders the bottle coatings too soft for use in this specific end use application.

The ethylene copolymer coating composition may be applied by methods known in the polymer coating art, as for example, spray, electrostatic powder spray or flame spraying of solid polymer particles or by dipping or spraying solutions or dispersions of the polymer. The temperature range preferred for coating bottles with the claimed coating composition is about 200°–300° C. with 230°–260° C. being particularly preferred. It has been found convenient to provide these coating temperatures by merely heating the bottles before the coating step with conventional heating means such as an oven. This obviates the necessity of having the coating system encumbered with a heating device.

The contacting time for coating is not narrowly critical. Times of about 2–15 minutes are preferred.

A unique feature of the method of this invention is that the glass bottle surfaces need not be subjected to conventional pretreatments, such as, flame treatment, electron radiation, chemical sizing or priming and the like although such techniques can be used if desired.

Effective protection of glass bottles coated with the ethylene copolymer composition described hereinabove is obtained with as little as about 5 mils average thickness although it is preferred to deposit a coating of about 10 mils to about 12 mils.

If desired, minor amounts of additives known in the art can be incorporated into the compositions of this invention including, adhesion promoters, heat stabilizers, slip additives, antiblocking agents, antioxidants, colorants, and the like.

Representative adhesion promoters include silane salts, amino silane salts, epoxy silanes, isocyanato silanes, tetra alkyl titanates having up to about 18 carbon atoms in each alkyl group and chromium fatty acid complexes. Preferred silane compounds include: beta(3,4-epoxycyclohexyl)ethyl trimethoxy silane, gamma-glycidoxypropyltrimethoxy silane, gamma-aminopropyltriethoxy silane and the like.

The amount of adhesion promoter preferred in these compositions will depend on the particular promoter used but generally is in the range of about 0.25 percent to about 2 percent by weight of the total composition.

Representative silane salts include:

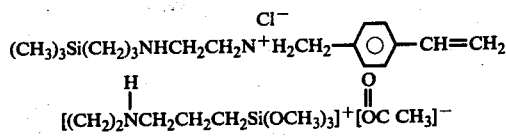

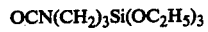

Representative amino silane salts include acetates or propionates of N-beta-(aminoethyl)-gamma-aminopropyl trimethoxysilane and gamma-aminopropyl-triethoxysilane, and the like.

Representative epoxy silanes include beta-(3,4-epoxycyclohexyl)ethyl trimethoxysilane, gamma-glycidylpropyltrimethoxysilane, and the like.

A representative isocyanato silane has the formula:

$$OCN(CH_2)_3Si(OC_2H_5)_3$$

Representative tetra alkyl titanates having up to 18 carbon atoms in the alkyl group include: tetrabutyl titanate, tetrapropyl titanate, tetraisopropyl titanate, isopropyl triisostearoyl titanate, isopropyl tri(laurylmyristyl)titanate, and the like.

Preferred heat stabilizers include hindered phenol-organo phosphite blends, hindered phenol-organo phosphonate blends and the like.

Preferred slip additives include styrenated silicone, trimethyl end blocked dimethyl siloxane fluids, and the like.

Preferred anti-blocking agents include ethylene bisstearamide, ethyl bis(hydroxy stearamide), stearyl stearamide and the like.

The invention is further described in the examples which follow. All parts and percentages are by weight unless otherwise specified.

EXAMPLE 1

PREPARATION OF ETHYLENE TETRAPOLYMER POWDER

An ethylene/ethyl acrylate copolymer containing about 18% by weight of ethyl acrylate copolymerized therein was subjected to ammonolysis in the melt state with an equimolar amount of monomethylamine in a pressure vessel at a temperature of 340°–380° C. and a pressure of 500–1000 psig. The resultant product was a tetrapolymer containing about 82% ethylene about 3.5% ethyl acrylate, about 1% acrylic acid and about 13.5% monomethyl acrylamide moieties. The melt index was about 69 decigrams/min. This product was extruded in the form of ⅛" pellets and pulverized in a hammer mill maintained at −157° C. by liquid nitrogen. Any moisture which condensed on the resultant powder was removed by vacuum drying. The dried powder was classified with a No. 140 U.S. Series sieve described on page 911, of The Handbook of Chemistry, edited by N. A. L. Lange, Tenth Edition, McGraw-Hill Book Co. NYC 1961. The material which passed through the sieve was used for bottle powder coating.

EXAMPLE 2

BOTTLE COATING

Carbonated beverage bottles, 32 ounce capacity, were placed in a forced circulation oven at 242° C. for 5 minutes. The hot bottles were transferred to an exhaust hood and subjected to an electrostatic spray with the powder prepared in Example 1. In this procedure polymer powder was drawn from a container and carried to the spray gun by compressed air. Individual particles of powder were electrostatically charged at 50–60 KV DC as they passed through the gun. The bottles to be coated were grounded and therefore were at a lower potential than the charged particles, so an electrostatic field was generated between the tip of the gun and the bottles. Particles projected from the gun were attracted to the surface of the bottles and adhered thereto until they were fused to this surface. The sintered powder coating on the bottles was then fused into a clear coating by baking in the oven for 2.5 minutes followed by air cooling. The average coating thickness on the bottles was about 10 mils.

EXAMPLE 3
PRESSURE TESTING

The coated bottles from Example 2 were filled with a mixture of water, sodium bicarbonate and sulfuric acid in an amount sufficient to generate an internal pressure of 60 psi when the bottles were capped. The liquid level was controlled to provide a 2% head space to simulate commercial carbonates beverage bottling operations. The filled bottles after storage at room temperature for 24 hours were dropped onto a 1 inch thick 12" × 12" steel target from a height of 4 feet.

Controls of uncoated bottles when dropped exploded and threw glass fragments over a distance of 20 feet. In contrast the coated bottles when dropped in the same manner as the Controls retained the fractured glass fragments within the flexible polymeric coating to the extent that over 80% of these fragments remained within a radius of 1.5 feet of the target drop zone.

EXAMPLE 4
MODIFIED BOTTLE COATING

The thermal stability of the ethylene tetrapolymer powder can be enhanced to offset any thermal degradation that may occur during the baking cycle used in applying the polymeric coating to bottles. It is convenient to add stabilizers to the ethylene tetrapolymer while fluxing in a mixing extruder at about 130° C. The extrudate can then be stranded and cooled in a water bath followed by pulverizing into powder as in Example 1. The bottle coating procedure of Example 2 can then be used with the stabilized polymer powder.

A combination of an organo phosphite and a hindered phenol maintain good color adhesion and clarity in the polymeric bottle coatings of this invention, which is particularly desirable for coatings on returnable bottles which must be cleaned and sterilized in hot alkaline detergent solutions.

Suitable organo phosphites include the cyclic neopentanetetrayl bis(alkyl phosphites), such as distearyl pentaerythritol diphosphite available, from Weston Chemical Co.

Preferred hindered phenols are those having the positions ortho and para to the phenolic group substituted with alkyl groups having 1 to 18 carbon atoms. Examples of such hindered phenols include tetrakis [methyl 3-(3',5'-di-t-butyl-4'-hydroxyphenyl)propionate]methane, N,N'-hexamethylene bis(3,5-di-t-butyl-4-hydroxy-hydrocinnamide), thiodiethylene bis-(3,5-di-t-butyl-4-hydroxy)hydrocinnamate, and the like.

If desired stabilizers consisting of a single compound containing hindered phenol and organo phosphonate functionalities can also be used. Examples of such compounds are O,O-di-N-octadecyl-3,5-di-t-butyl-4-hydroxybenzyl phosphonate, nickel bis [O-ethyl(3,5-di-t-butyl-4-hydroxybenzyl)]phosphonate, and the like.

Anchor-Hocking 32 ounce beverage bottles coated with a 5 mil thickness of the ethylene tetrapolymer of Example 1 containing 0.25 of the thermal stabilizers described above as in Example 2 showed fair to good clarity, color and adhesion after exposure to an aqueous bath containing 4.5% sodium hydroxide and 0.5% trisodium phosphate for 3.5 hours at about 72° C.

In addition the coated bottles tested under pressure as in Example 3 retained the glass fragments to the extent that over 90% remained within the radius of 1.5 feet of the target drop zone.

EXAMPLE 5
MODIFIED BOTTLE COATING

When Example 4 was repeated with an ethylene tetrapolymer containing 12.9% monomethyl acrylamide rather than 13.5% and having a melt index of 78 decigrams per minute rather than 69, the hot alkaline detergent resistance was also good.

EXAMPLE 6
MODIFIED BOTTLE COATING

When Example 4 was repeated with an ethylene tetrapolymer containing 12.6% monomethyl acrylamide and having a melt index of 103 decigrams per minute, hot alkaline detergent resistance was fair to good.

EXAMPLE 7
MODIFIED BOTTLE COATING

When Example 4 was repeated using an ethylene tetrapolymer containing 11.2% monomethyl acrylamide and having a melt index of 76 decigrams per minute, the coating after exposure to the hot alkaline detergent was hazy and poor. It should be noted however that this deficiency is not applicable to throwaway bottles where there is no stringent cleaning-sterilizing treatment.

EXAMPLE 8
MODIFIED BOTTLE COATINGS

Adhesion of the ethylene tetrapolymer to glass bottles which are to be used in a returnable bottle service can be further enhanced by melt mixing an adhesion promoter into said polymer. A preferred promoter is acetic acid salt of gamma aminopropyltriethoxy silane. When present at a concentration of 0.5 to 1.0 parts per hundred parts of the ethylene tetrapolymer of Example 1 together with 4 parts of O,O-di-n-octadecyl-3,5-di-t-butyl-4-hydroxybenzyl phosphonate per hundred parts of the same ethylene polymer, the resultant bottle coating withstood the following immersion test for 3 to 3.5 hours:

1. Coated bottle immersed in alkaline detergent for 0.5 hours at 72° C.
2. Bottle removed with tongs and rinsed in water at 72° C.
3. Neck and base of bottle checked for loss adhesion, by rubbing coating vigorously to dislodge the film.
4. Repeated until failure.

In contrast when the above coating composition lacked the adhesion promoter, the coatings failed after 1 hour exposure to this test. In addition, bottles coated to a thickness of 7–8 mils with the above composition when tested under pressure as in Example 3 retained glass fragments to the extent that 94% to 99% remained within the radius of 1.5 feet of the target drop zone.

Although the invention has been described in its preferred forms with a certain degree of particularity, it is understood that the present disclosure of the preferred forms has been made only by way of example and that numerous changes may be resorted to without departing from the spirit and scope of the invention.

What is claimed is:

1. An article of manufacture comprising a glass bottle having its outer surface coated with a continuous layer amount of a random ethylene copolymer having a melt index of about 60 to about 120 decigrams per minute when measured under a pressure of 44 psi at a temperature of 190° C. in accordance with ASTM D-1238, containing copolymerized therein:
   (a) about 0.05 to about 4 mole percent of an acrylic ester moiety having the formula:

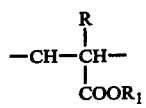

(b) about 0.01 to about 1 mole percent of an acrylic acid moiety having the formula:

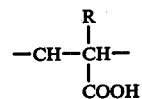

(c) about 2 to about 8 mole percent of an amide moiety having the formula:

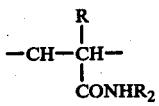

wherein R is hydrogen or methyl and each of $R_1$ and $R_2$ is an alkyl group having one to four carbon atoms and the remainder consisting essentially of ethylene moieties.

2. The article claimed in claim 1 wherein the amide moiety constitutes about 4 to about 7 mole percent of the ethylene copolymer.

3. The article claimed in claim 1 blended with about 0.25 to about 2 percent by weight of the total composition of an adhesion promoter selected from the class consisting of silane salts, amino silane salts, epoxy silanes, isocyanato silanes, tetra alkyl titanates having up to 18 carbon atoms in each alkyl group and chromium fatty acid complexes.

4. The article claimed in claim 3 wherein the adhesion promoter is an amino silane salt.

5. The article claimed in claim 3 wherein the adhesion promoter is an epoxy silane.

6. The article claimed in claim 3 wherein the adhesion promoter is an isocyanato silane.

7. The article claimed in claim 1 wherein the powder composition is in the form of powder particles less than 140 mesh.

8. The article claimed in claim 1 wherein R is hydrogen, $R_1$ is ethyl and $R_2$ is methyl.

9. The method for coating glass bottles with a continuous coating of a random ethylene copolymer which comprises contacting said glass bottles at a temperature of about 200° to about 300° C. under powder conditions with sufficient powder coating composition to provide a continuous coating on said bottle surfaces, said coating composition consisting essentially of: a major amount of a random ethylene copolymer having a melt index of about 60 to about 120 decigrams per minute measured at 44 psi and 190° C., containing copolymerized therein:
   (a) about 0.05 to about 4 mole percent of an acrylic ester moiety having the formula:

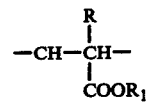

(b) about 0.01 to about 1 mole percent of an acrylic acid moiety having the formula:

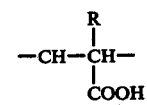

(c) about 2 to about 8 mole percent of an amide moiety having the formula:

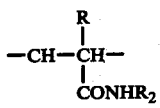

wherein R is hydrogen or methyl and each of $R_1$ and $R_2$ is an alkyl group having from 1 to 4 carbon atoms and the remainder consisting essentially of ethylene moieties.

10. Method claimed in claim 8 wherein R is hydrogen, $R_1$ is ethyl and $R_2$ is methyl.

11. The method claimed in claim 8 wherein the powder coating composition has a particle size of less than about 140 mesh.

12. The method claimed in claim 10 wherein the powder coating is carried out under electrostatic conditions.

13. Method claimed in claim 9 wherein the coating composition is blended with about 0.25 to about 2 percent by weight of the total compositions of an adhesion promoter selected from the class consisting of, silane salts, amino silane salts, epoxy silanes, isocyanato silanes, tetra alkyl titanates having up to 18 carbon atoms in each alkyl group and chromium fatty acid complexes.

14. Method claimed in claim 13 wherein the adhesion promoter is an amino silane salt.

15. Method claimed in claim 13 wherein the adhesion promoter is an epoxy silane.

16. Method claimed in claim 13 wherein the adhesion promoter is an isocyanato silane.

* * * * *